US010771561B2

(12) United States Patent
Cha et al.

(10) Patent No.: US 10,771,561 B2
(45) Date of Patent: Sep. 8, 2020

(54) MANAGING SELECTIVE ACCESS OF A USER EQUIPMENT TO INTERNET-BASED SERVICES BASED ON TRANSPORT TYPE

(71) Applicant: OMNITRACS, LLC, Dallas, TX (US)

(72) Inventors: David S. Cha, Dallas, TX (US); Daniel A. Deninger, Dallas, TX (US); Kenneth H. Oertle, Dallas, TX (US); Jason M. Riggs, Dallas, TX (US)

(73) Assignee: OMNITRACS, LLC, Dallas, TX (US)

( * ) Notice: Subject to any disclaimer, the term of this patent is extended or adjusted under 35 U.S.C. 154(b) by 22 days.

(21) Appl. No.: 15/980,862

(22) Filed: May 16, 2018

(65) Prior Publication Data

US 2018/0262575 A1    Sep. 13, 2018

Related U.S. Application Data

(62) Division of application No. 13/560,814, filed on Jul. 27, 2012, now Pat. No. 10,003,652.

(Continued)

(51) Int. Cl.
*H04L 29/08* (2006.01)
*H04W 88/18* (2009.01)

(52) U.S. Cl.
CPC ......... *H04L 67/125* (2013.01); *H04L 67/34* (2013.01); *H04W 88/182* (2013.01)

(58) Field of Classification Search
CPC ... H04W 88/16; H04W 88/18; H04W 88/182; H04W 76/02
See application file for complete search history.

(56) References Cited

U.S. PATENT DOCUMENTS 7,587,499 B1   9/2009 Haghpassand
7,706,266 B2   4/2010 Plamondon
(Continued)

FOREIGN PATENT DOCUMENTS

EP   1 418 731 A1   5/2004
EP   1 686 820 A1   8/2006
(Continued)

OTHER PUBLICATIONS

International Search Report issued in PCT/US2013/029154 dated Oct. 24, 2013.
(Continued)

*Primary Examiner* — Walli Z Butt
*Assistant Examiner* — Ryan C Kavleski
(74) *Attorney, Agent, or Firm* — Arent Fox, LLP

(57) ABSTRACT

In an embodiment, a subordinate mobile communication device (SMCD) receives a content access profile from a dispatcher. The content access profile includes (i) proxy server selection criteria to facilitate the SMCD to select between a plurality of proxy servers based on a current transport mechanism type (e.g., WiFi, 3G, Satellite, etc.), each of the plurality of proxy servers being configured by the dispatcher to provide different degrees of support for Internet-based services to the SMCD, and/or (ii) a set of Internet-based service access rules to facilitate the SMCD to independently determine whether to grant or deny access by the SMCD to Internet-based services based on the current transport mechanism type of a connection between the SMCD and an access network. The SMCD determines its current transport mechanism type and uses the content access profile to selectively engage with a given Internet-based service.

18 Claims, 12 Drawing Sheets

Related U.S. Application Data

(60) Provisional application No. 61/606,937, filed on Mar. 5, 2012.

(56) References Cited

U.S. PATENT DOCUMENTS

| | | |
|---|---|---|
| 8,060,419 B2 | 11/2011 | Doyle et al. |
| 8,131,281 B1 | 3/2012 | Hildner et al. |
| 2002/0069241 A1 | 6/2002 | Narlikar et al. |
| 2003/0043773 A1 | 3/2003 | Chang |
| 2004/0009761 A1* | 1/2004 | Money ................ H04M 15/08 455/406 |
| 2005/0083899 A1 | 4/2005 | Babbar et al. |
| 2005/0228870 A1 | 10/2005 | De Boor et al. |
| 2005/0260973 A1* | 11/2005 | van de Groenendaal ................ H04M 1/72577 455/411 |
| 2009/0067628 A1 | 3/2009 | Pudney et al. |
| 2009/0221267 A1* | 9/2009 | Bender ................ G06F 21/554 455/412.2 |
| 2009/0228963 A1* | 9/2009 | Pearce ................ H04L 63/0815 726/5 |
| 2010/0027522 A1 | 2/2010 | Mukai et al. |
| 2011/0125833 A1 | 5/2011 | Persson et al. |
| 2011/0149950 A1 | 6/2011 | Petit-Huguenin et al. |
| 2012/0005343 A1 | 1/2012 | Ji et al. |
| 2012/0222107 A1 | 8/2012 | Sainio et al. |
| 2013/0256403 A1* | 10/2013 | MacKinnon Keith ... G06K 5/00 235/375 |
| 2014/0122580 A1 | 5/2014 | Nuaimi et al. |

FOREIGN PATENT DOCUMENTS

| | | |
|---|---|---|
| EP | 2 091 190 A1 | 8/2009 |
| JP | 2010-098485 A | 4/2010 |

OTHER PUBLICATIONS

Partial International Search Report—PCT/US2013/029154—International Search Authority European Patent Office Jun. 14, 2013.

\* cited by examiner

MANAGING SELECTIVE ACCESS OF A USER EQUIPMENT TO INTERNET-BASED SERVICES BASED ON TRANSPORT TYPE

CLAIM OF PRIORITY UNDER 35 U.S.C. § 119

The present Application for patent is a Divisional of U.S. patent application Ser. No. 13/560,814, entitled, "MANAGING SELECTIVE ACCESS OF A USER EQUIPMENT TO INTERNET-BASED SERVICES BASED ON TRANSPORT TYPE," filed Jul. 27, 2012, which claims priority to Provisional Application No. 61/606,937, entitled "MANAGING SELECTIVE ACCESS OF A USER EQUIPMENT TO INTERNET BASED SERVICES BASED ON TRANSPORT TYPE", filed Mar. 5, 2012, assigned to the assignee hereof and hereby expressly incorporated by reference herein.

BACKGROUND OF THE INVENTION

1. Field of the Invention

Embodiments relate to managing selective access of a user equipment to Internet-based services based on transport type.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data, Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

SUMMARY

In an embodiment, a subordinate mobile communication device (SMCD) receives a content access profile from a dispatcher. The content access profile includes (i) proxy server selection criteria to facilitate the SMCD to select between a plurality of proxy servers based on a current transport mechanism type (e.g., WiFi, 3G, Satellite, etc.), each of the plurality of proxy servers being configured by the dispatcher to provide different degrees of support for Internet-based services to the SMCD, and/or (ii) a set of Internet-based service access rules to facilitate the SMCD to independently determine whether to grant or deny access by the SMCD to Internet-based services based on the current transport mechanism type of a connection between the SMCD and an access network. The SMCD determines its current transport mechanism type and uses the content access profile to selectively engage with a given Internet-based service.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
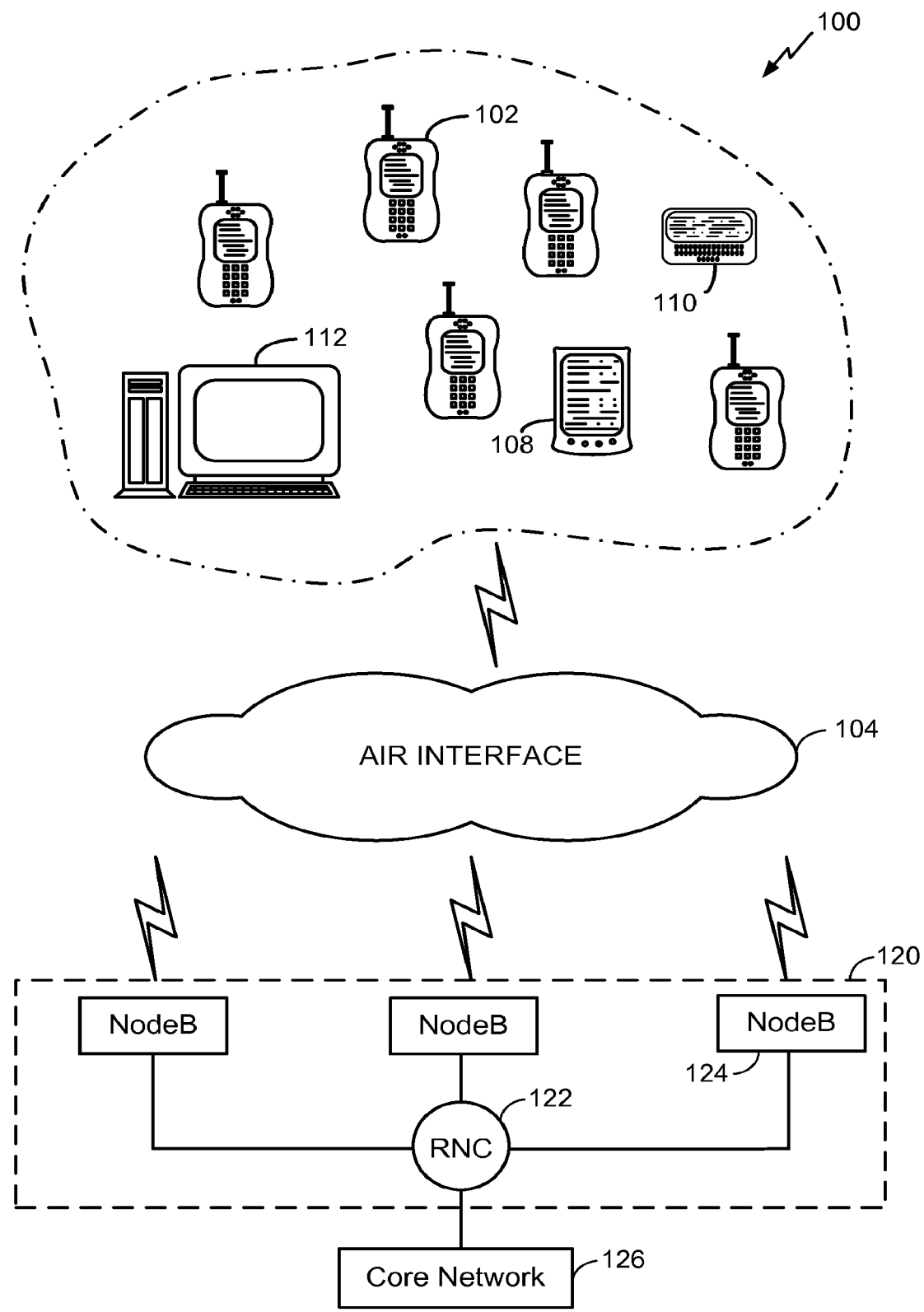
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant or tablet computer 108, laptop 110, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof Further, as used herein, the term "UE" in other communication protocols (i.e., other than W-CDMA) may be referred to interchangeably as an "access terminal," "AT," "wireless device," "client device," "mobile terminal," "mobile station" and variations thereof Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2:
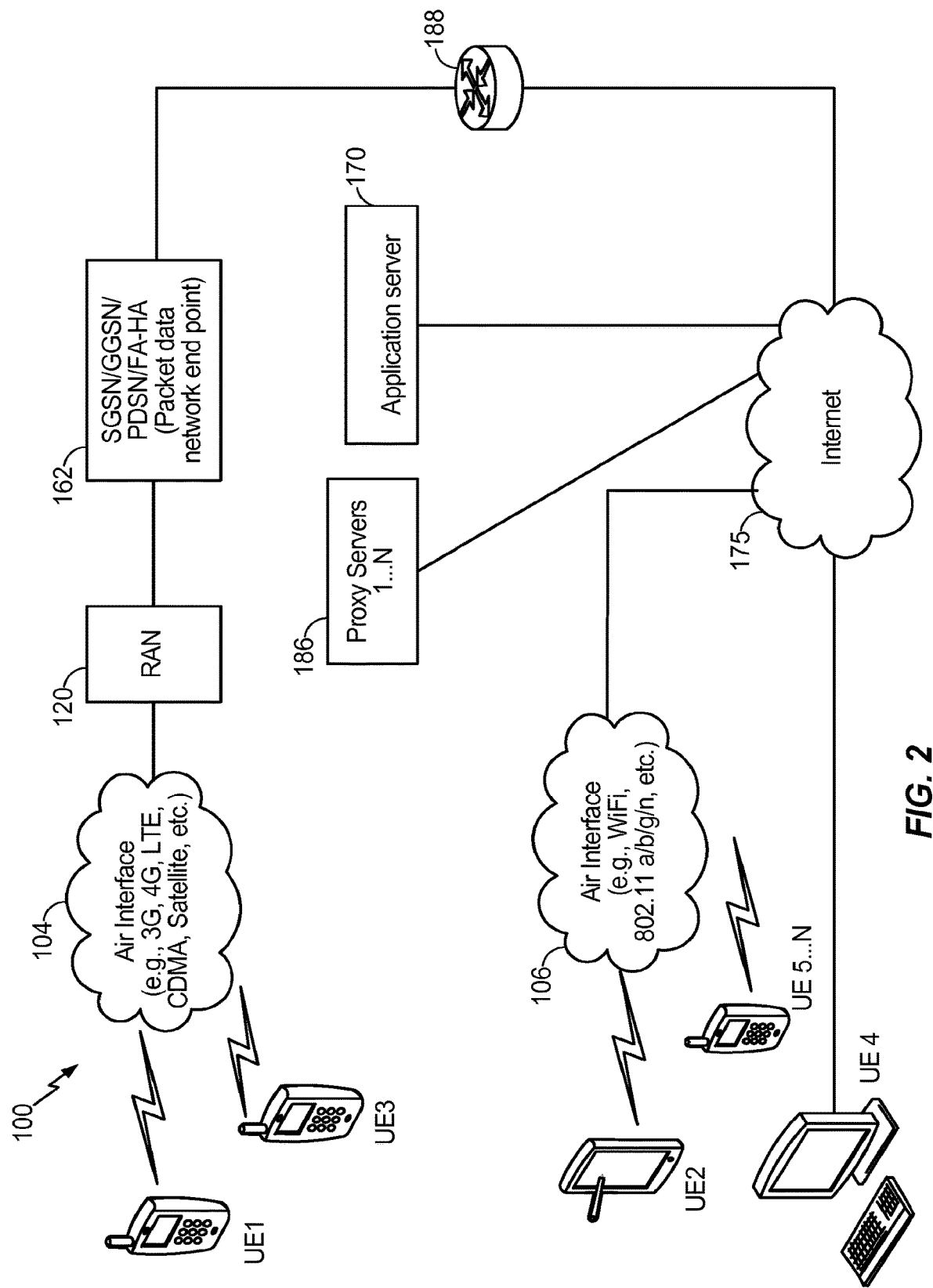
FIG. 2 illustrates a core network according to an embodiment of the present invention.

FIG. 2 illustrates an example of the wireless communications system 100 of FIG. 1 in more detail. In particular, referring to FIG. 2, UEs 1 . . . N are shown as connecting to the RAN 120 at locations serviced by different packet data network end-points. The illustration of FIG. 2 is specific to W-CDMA systems and terminology, although it will be appreciated how FIG. 2 could be modified to conform with various other wireless communications protocols (e.g., LTE, EV-DO, UMTS, etc.) and the various embodiments are not limited to the illustrated system or elements.

UEs 1 and 3 connect to the RAN 120 at a portion served by a first packet data network end-point 162 (e.g., which may correspond to SGSN, GGSN, PDSN, a home agent (HA), a foreign agent (FA), PGW/SGW in LTE, etc.). The first packet data network end-point 162 in turn connects, via the routing unit 188, and through the routing unit 188, to the Internet 175. Through the Internet 175, the UEs 1 and 3 can connect to an application server 170 that is configured to provide one or more Internet-based services (e.g., streaming video, web-browsing, etc.). Also, through the Internet 175, UEs 1 and 3 can connect to one or more of proxy servers 1 . . . N, 186. The proxy servers 1 . . . N 186 will be described in more detail below. Generally, each of the proxy servers 1 . . . N 186 functions as a gateway between UEs 1 . . . N and servers that provide Internet-based services, such as the application server 170. UEs 2 and 5 . . . N connect to the Internet 175 via a different air interface 106, such as a WiFi or IEEE 802.11 a/b/g/n interface via a local wireless access point or hotspot. UE 4 connects directly to the Internet 175 via a wired connection (e.g., a LAN or Ethernet connection), and through the Internet 175 can then connect to any of the system components described above.

Referring to FIG. 2, UEs 1, 3 and 5 . . . N are illustrated as wireless cell-phones, UE 2 is illustrated as a wireless tablet-and/or laptop PC, and UE 4 is illustrated s a desktop PC. However, in other embodiments, it will be appreciated that the wireless communication system 100 can connect to any type of UE, and the examples illustrated in FIG. 2 are not intended to limit the types of UEs that may be implemented within the system.

Figure 3:
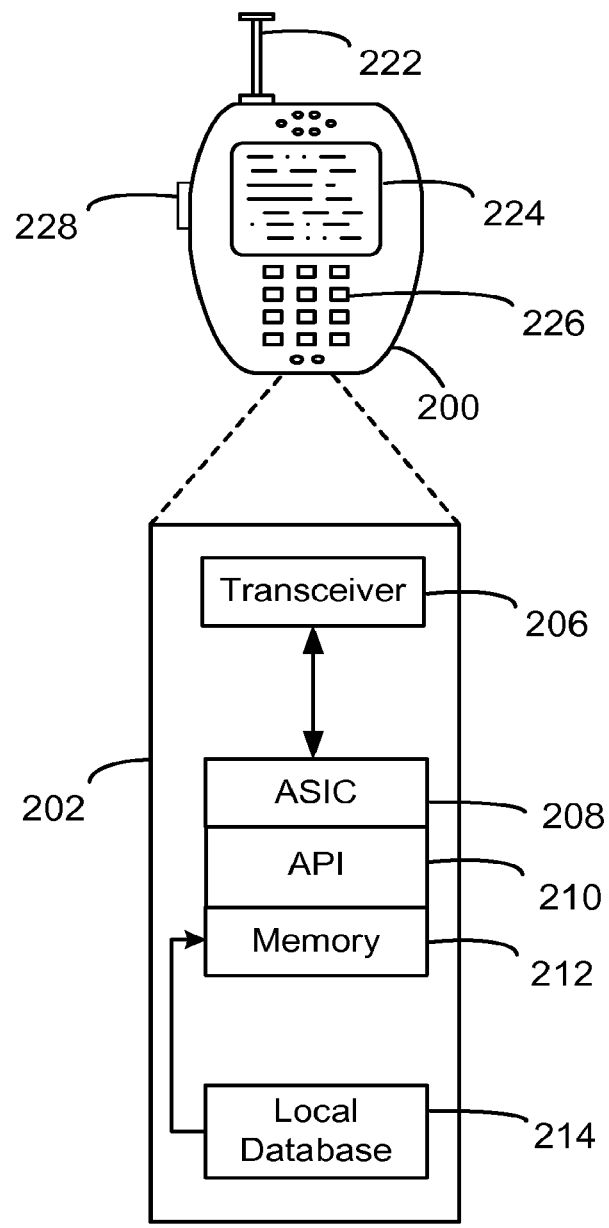
FIG. 3 is an illustration of a user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet 175 and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (ROM and RAM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies or transport mechanisms, such as code division multiple access (CDMA), W-CDMA, time division multiple access (TDMA), frequency division multiple access (FDMA), Orthogonal Frequency Division Multiplexing (OFDM), the Global System for Mobile Communications (GSM), 3GPP Long Term Evolution (LTE) or other protocols that may be used in a wireless communications network or a data communications network. Accordingly, the illustrations provided herein are not intended to limit the embodiments of the invention and are merely to aid in the description of aspects of embodiments of the invention.

Figure 4:
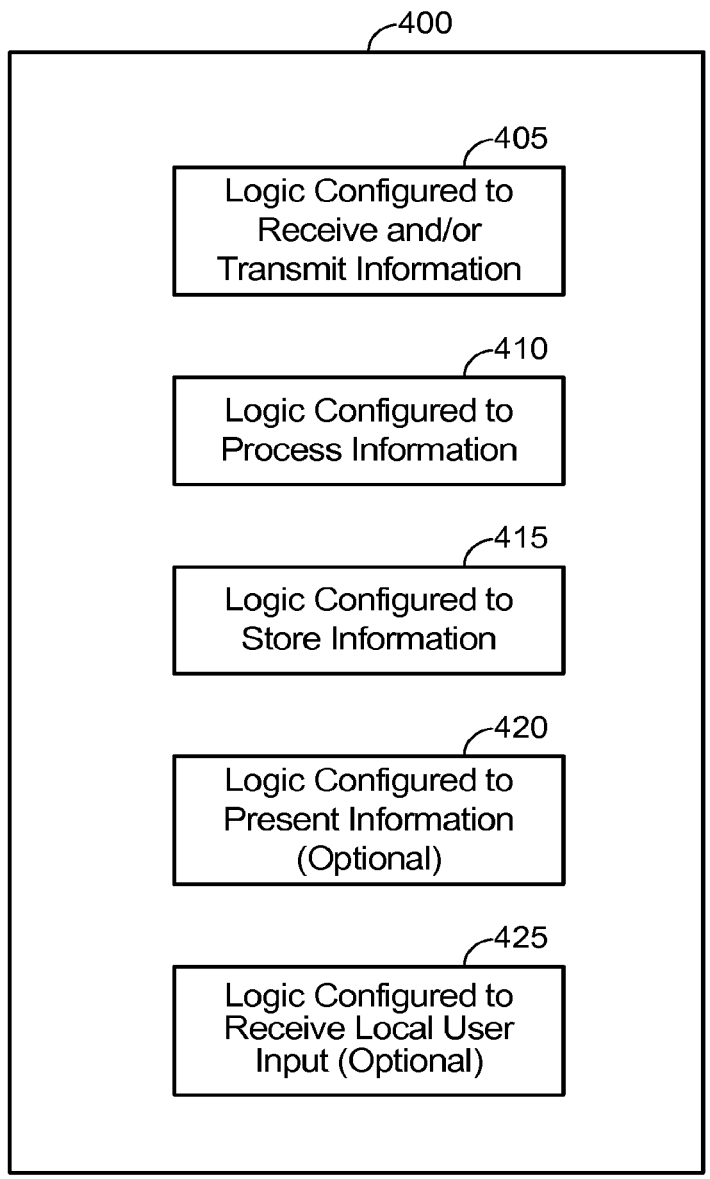
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 102, 108, 110, 112 or 200, Node Bs or base stations 120, the RNC or base station controller 122, a packet data network end-point (e.g., SGSN, GGSN, a Mobility Management Entity (MME) in Long Term Evolution (LTE), etc.), any of the servers 170 through 186, etc. Thus, communication device 400 can correspond to any electronic device that is configured to communicate with (or facilitate communication with) one or more other entities over a network.

Referring to FIG. 4, the communication device 400 includes logic configured to receive and/or transmit information 405. In an example, if the communication device 400 corresponds to a wireless communications device (e.g., UE 200, Node B 124, etc.), the logic configured to receive and/or transmit information 405 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., SGSN, GGSN, application server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 200 as shown in FIG. 3, the logic configured to present information 420 can include the display 224. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 200 as shown in FIG. 3, the logic configured to receive local user input 425 can include the display 224 (if implemented a touch-screen), keypad 226, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

It can be difficult for administrators (or dispatchers) to regulate usage associated with subordinate mobile communication devices provisioned to end-users (e.g., employees, independent contractors, agents, etc.). For example, assume that an administrator of a trucking fleet provisions 1000 separate mobile communication devices to 1000 separate truck delivery vehicles. At different times during their respective truck delivery schedules, the respective, truckers may wish to access Internet-based services (e.g., NETFLIX, web-browsing, etc.). The cost associated with the access to these Internet-based services can vary based on current conditions of the respective truck delivery vehicles, such as the location of the truck delivery vehicles, the transport mechanism type (e.g., 3G, WiFi, etc.) of a connection between the truck delivery vehicles and an access network, and so on. Conventionally, the subordinate mobile communication devices can be required by a dispatcher required to mediate their access to Internet-based services through a proxy server that will either grant or deny the subordinate mobile communication devices access to requested Internet-based services. However, the proxy server contacted by the subordinate mobile communication devices for access to Internet-based services is not necessarily aware of factors that contribute to the overall cost of provisioning the requested Internet-based service, such as the current transport mechanism type of a requesting subordinate mobile communication device.

Accordingly, embodiments of the present invention relate selectively permitting a subordinate mobile communication device to access a given Internet-based service based at least in part upon the current transport mechanism type (e.g., WiFi, 3G, etc.) of the subordinate mobile communication device. As will be explained in detail below, the subordinate mobile communication device can be directed to a specialized proxy server configured to support a particular transport mechanism type (e.g., see FIGS. 5A-6), the subordinate mobile communication device can enforce service restrictions itself based on its current transport mechanism type (e.g., FIG. 7) or a hybrid approach can be implemented whereby the subordinate mobile communication device enforces service restrictions and, if self-permitted, can then direct requests for Internet-based services to a specialized proxy server configured to support its current transport mechanism type (e.g., FIGS. 8A-8B).

Figure 5A:
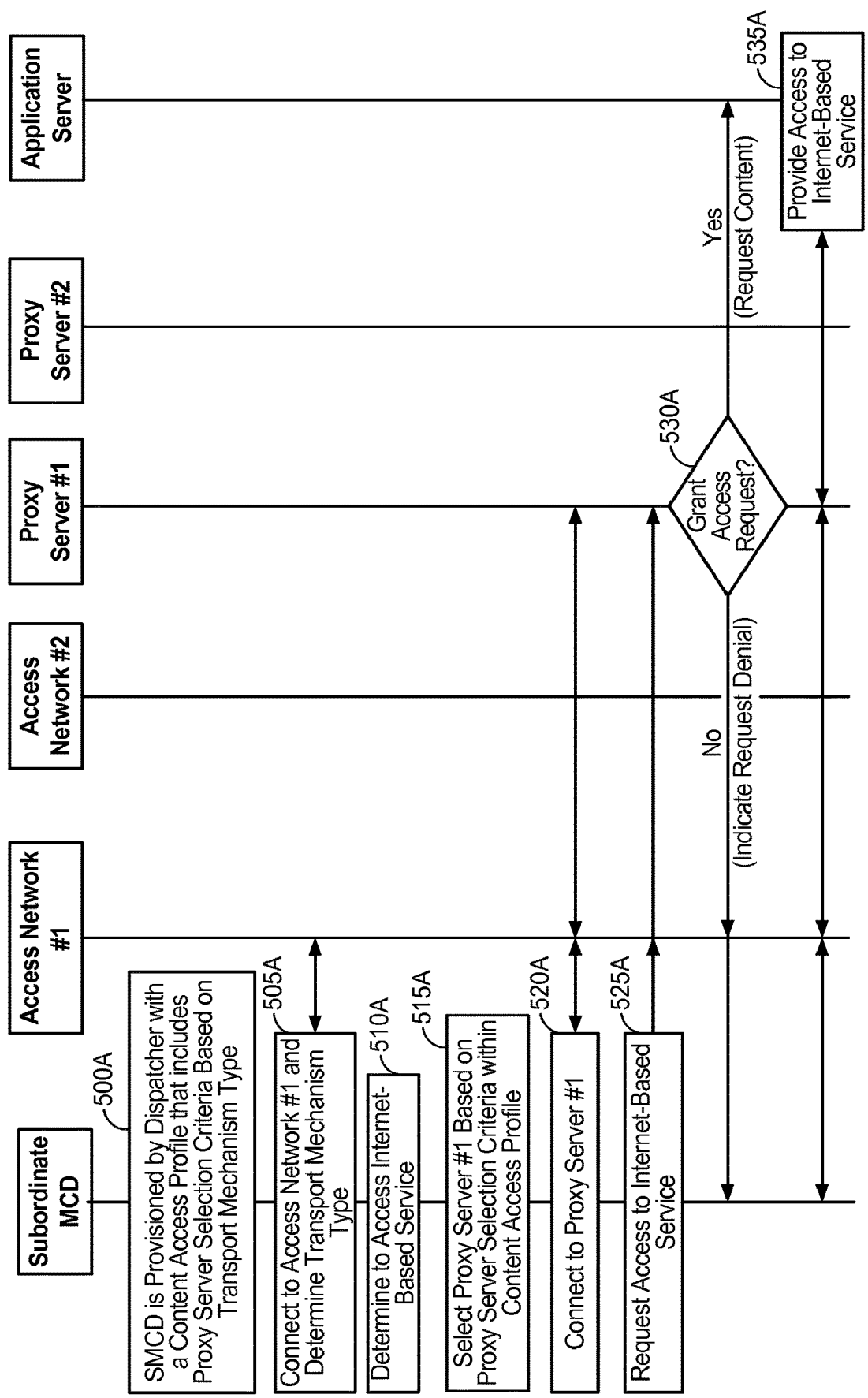
FIG. 5A illustrates a process of selecting a proxy server to obtain access to an Internet-based service in accordance with an embodiment of the invention.

FIG. 5A illustrates a process of selecting a proxy server to obtain access to an Internet-based service in accordance with an embodiment of the invention. Referring to FIG. 5A, a given subordinate mobile communication device (MCD) is provisioned by a dispatcher (e.g., manually via an administrator, or via messaging with an administrator device or server) with a content access profile that includes proxy server selection criteria based on transport mechanism type, 500A. For example, the proxy server selection criteria contained within the content access profile may be configured as shown in Table 1, as follows:

TABLE 1

Example of Proxy Server Association to Transport Mechanism Type

| Transport Mechanism Type | Proxy Server |
|---|---|
| WiFi (Unlimited) | #1: Network Address: W |
| WiFi (Pay-per-use) | #2: Network Address: X |
| Satellite Base Station | #3: Network Address: Y |
| Terrestrial Base Station (e.g., LTE, 3G, etc.) | #4: Network Address: Z |

As shown in Table 1, a single transport mechanism type (e.g., WiFi) can be associated with different proxy servers based on additional factors such as whether the WiFi is free and unlimited, or whether the WiFi is pay-per-use (e.g., a vendor-operated WiFi hotspot, such as at a hotel).

Figure 5B:
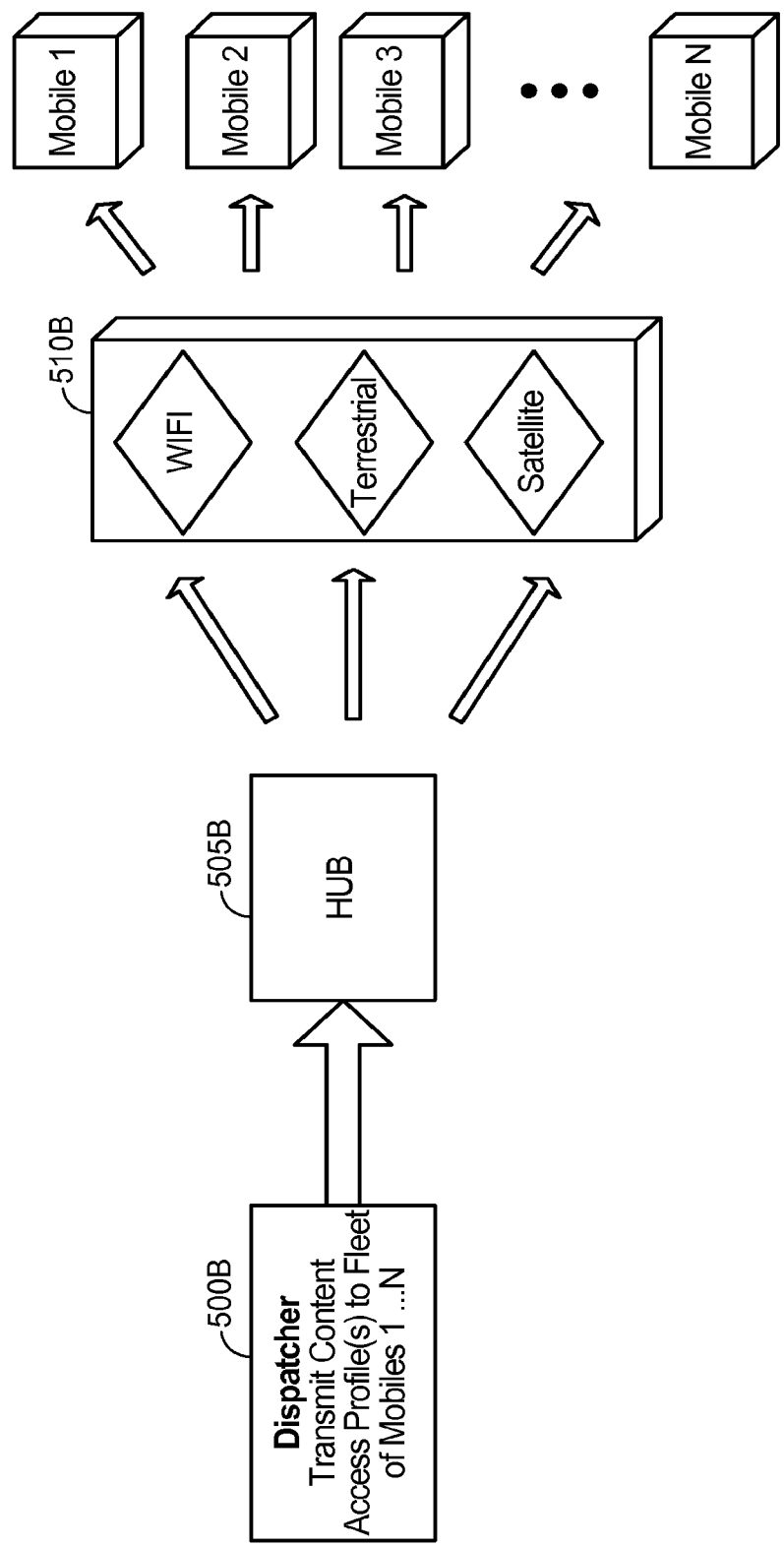
FIG. 5B illustrates an example of the content access profile provisioning operation by a dispatcher to a plurality of subordinate mobile communication devices in accordance with an embodiment of the invention.
Figure 5C:
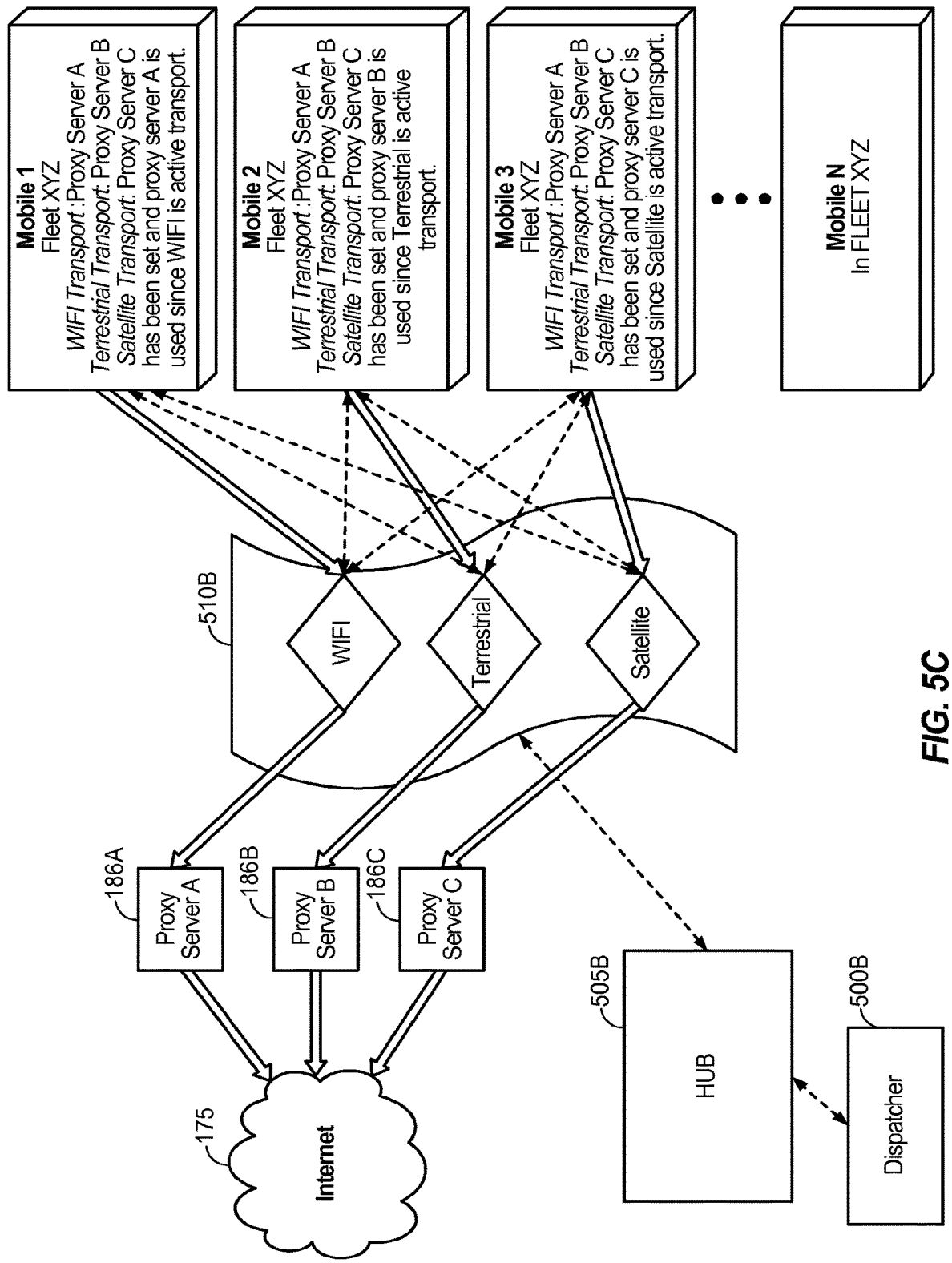
FIG. 5C then illustrates the plurality of subordinate mobile communication devices after being provisioned with content access profiles in accordance with an embodiment of the invention.
Figure 5D:
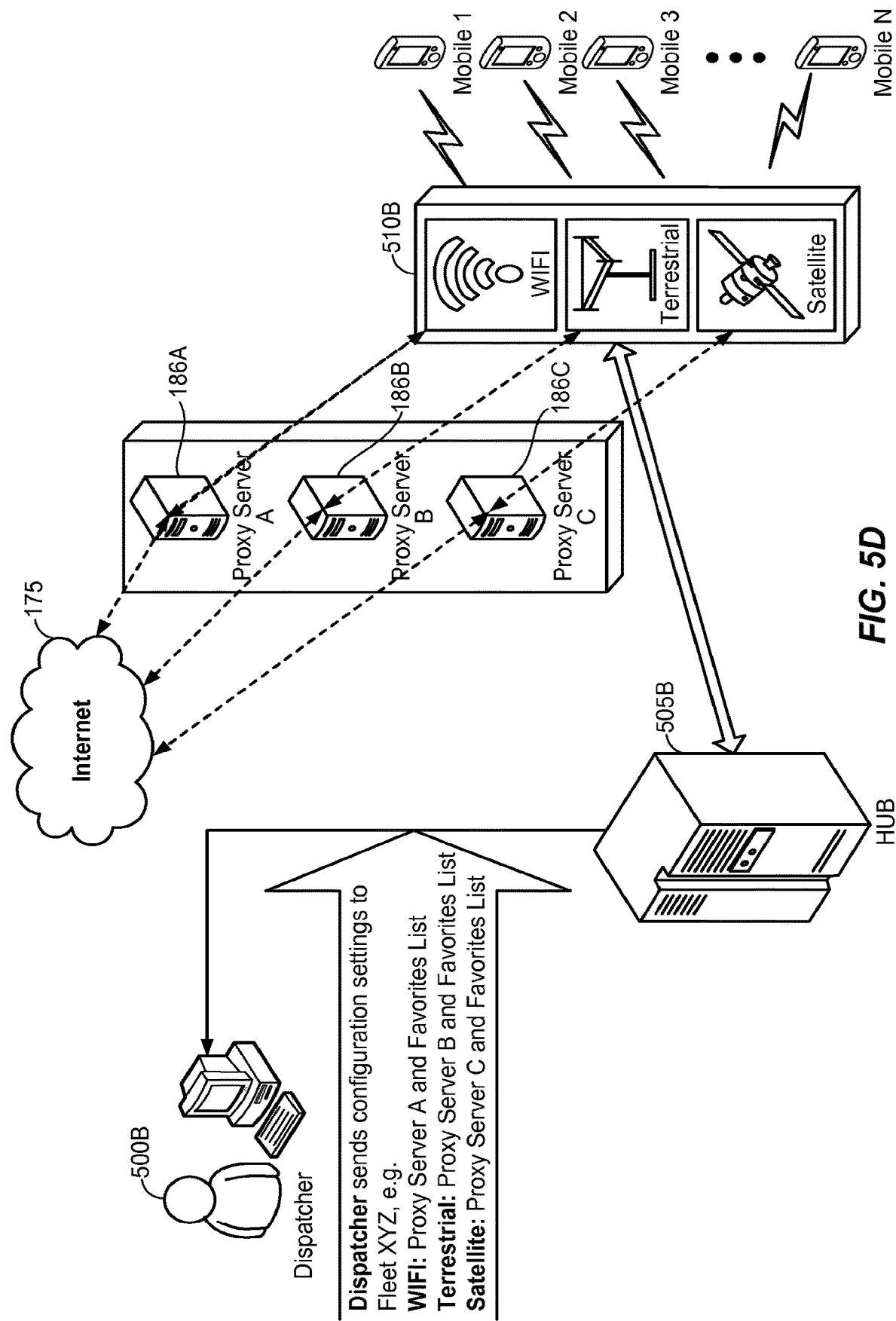
FIG. 5D illustrates a similar architecture as shown in FIGS. 5B and 5C in accordance with an embodiment of the invention.

Referring to 500A of FIG. 5A, the dispatcher can provision the subordinate MCD with the content access profile before deployment, or can update the content access profile after the subordinate MCD is deployed. FIG. 5B illustrates an example of the content access profile provisioning operation by a dispatcher to a plurality of subordinate MCDs. Referring to FIG. 5B, a dispatcher (e.g., an administrator device or server) transmits one or more content access profiles to a network hub 505B, which forwards the content access profiles to access networks 510B associated with different transport mechanism types (e.g., WiFi, terrestrial base stations, Satellite base stations, etc.). The access networks 510B in turn transmit the content access profiles to their respective served MCDs 1 . . . N. The content access profile distribution procedure shown in FIG. 5B can be an example of an initial configuration or set-up of the content access profiles at the respective MCDs 1 . . . N, or alternatively can correspond to a content access profile update procedure for one or more of MCDs 1 . . . N whereby the distributed content access profiles are intended to replace any pre-existing content access profiles. FIG. 5C then illustrates the plurality of MCDs 1 . . . N after being provisioned with the content access profiles, specifically, content access profiles that instruct the MCDs 1 . . . N to connect to proxy server A 186A when connected via WiFi, to proxy server B 186B when connected via a terrestrial base station and to proxy server C 186C when connected to a satellite base station. FIG. 5D illustrates a similar architecture as shown in FIGS. 5B and 5C, whereby the dispatcher 500B sends configuration settings (or content access profiles) to MCDs 1 . . . N via the network hub 505B, and the respective MCDs 1 . . . N then selectively contact one of proxy servers A, B or C based on their current transport mechanism type.

At some point after the subordinate MCD is deployed and in-use (e.g., the subordinate MCD is contained within a truck delivery vehicle during an active delivery, etc.), the subordinate MCD connects to a first access network and determines a first transport mechanism type associated with the first access network, 505A. For example, the first transport mechanism type can correspond to a terrestrial base station (e.g., 3G, 4G, LTE, etc.), a WiFi or WLAN hotspot, a satellite base station, and so on. The subordinate MCD determines to access a given Internet-based service (e.g., NETFLIX, YOUTUBE, PANDORA music, etc.) while connected to the first access network, 510A. For example, while not shown explicitly in FIG. 5A, the determination of 510A can be responsive to a request for the Internet-based service received from an operator of the subordinate MCD.

After determining to access the Internet-based service at 510A, the subordinate MCD selects a first proxy server for supporting the Internet-based service based on the proxy server selection criteria contained within the content access profile, 515A. For example, assuming that the content access profile is configured as shown above in Table 1 and that the first transport mechanism type of the first access network corresponds to a an unlimited WiFi connection, then the subordinate MCD selects proxy server #1 which can be contacted at network address W at 515A. After selecting the first proxy server at 515A, the subordinate MCD establishes a connection with the first proxy server via the first access network, 520A. The subordinate MCD then requests access to the Internet-based service from the first proxy server, 525A.

In the embodiment of FIG. 5A, each of proxy servers 1 . . . N 186 (introduced above with respect to FIG. 2) are associated with providing different levels or degrees of support for Internet-based services to the subordinate MCD. For example, a higher-level of support or access to Internet-based services can be provided when the subordinate MCD is connected to an unlimited WiFi connection as compared to when the subordinate MCD is connected to a more costly Satellite base station. Accordingly, the level of access allocated to the subordinate MCD can be controlled through its proxy server selection, which is itself controlled based on the subordinate MCD's current transport mechanism type.

Accordingly, after the first proxy server receives the request for access to the Internet-based service at 525A, the first proxy server determines whether to grant the request in 530A. If the first proxy server determines not to grant the request at 530A, the subordinate MCD is notified that its request for access to the Internet-based service is rejected (e.g., potentially, the subordinate MCD or an operator thereof can also be notified of a transport mechanism type, that would be capable of supporting the requested Internet-based service). Otherwise, if the first proxy server determines to grant the request at 530A, the application server 170 associated with the Internet-based service is contacted by the first proxy server, and the application server 170 then begins to provide the subordinate MCD with access to the Internet-based service via the first proxy server, 535A. For example, if the subordinate MCD requests to stream a NETFLIX movie at 525A, the application server 170 corresponds to a NETFLIX video streaming server that streams the requested movie to the subordinate MCD at 535A.

Figure 6:
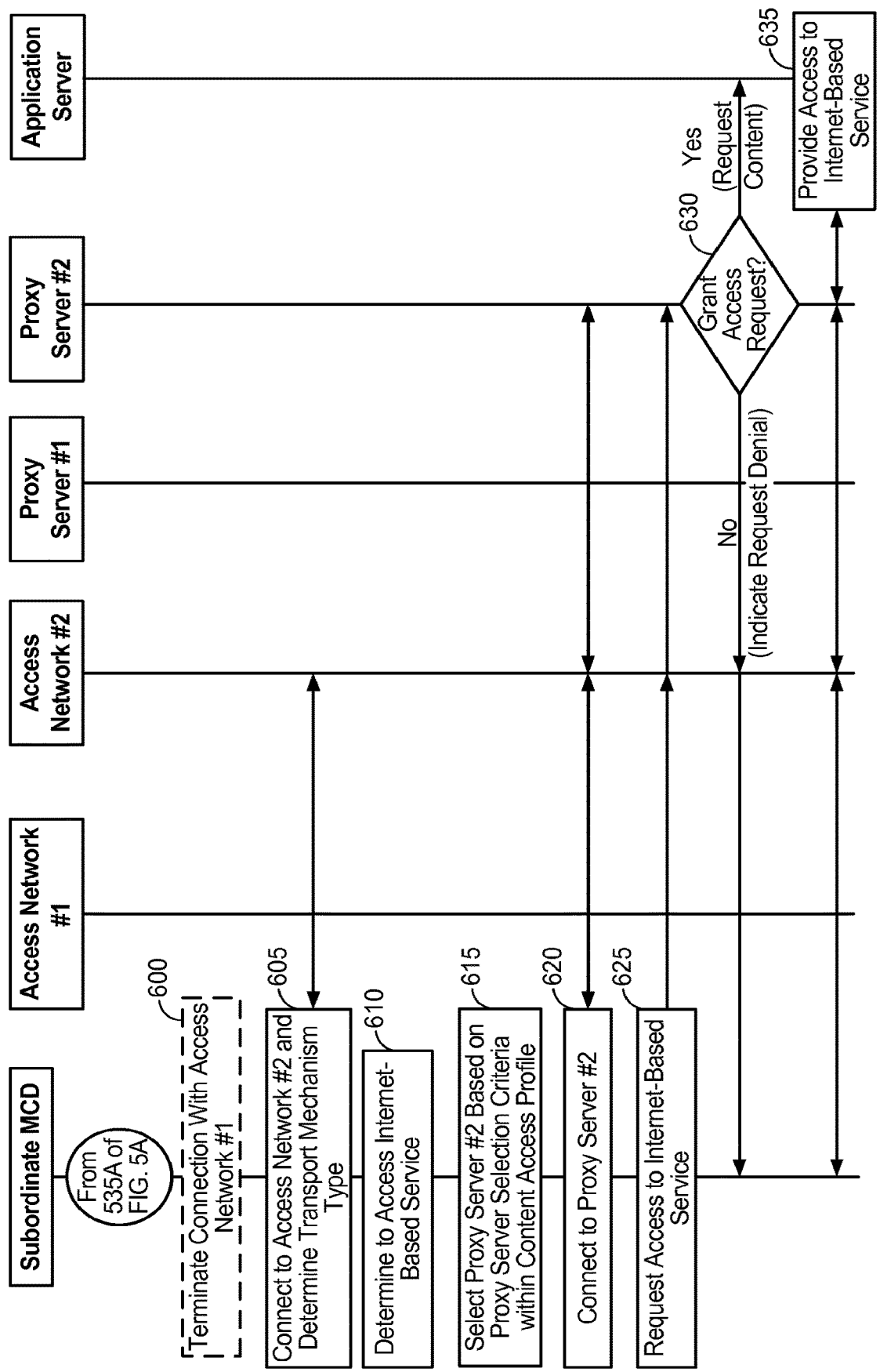
FIG. 6 illustrates a continuation of the process of FIG. 5A in accordance with an embodiment of the invention.

FIG. 6 illustrates a continuation of the process of FIG. 5A in accordance with an embodiment of the invention. Referring to FIG. 6, the subordinate MCD terminates its connection with the first access network, 600, and then connects to a second access network and determines a second transport mechanism type associated with the second access network, 605. In the embodiment of FIG. 6, assume that the second transport mechanism type of the second access network is different from the first transport mechanism type of the first access network. For example, the first transport mechanism may correspond to WiFi and the second transport mechanism may correspond to a terrestrial cellular access network or base station. Also, in the embodiment of FIG. 6, the connection termination shown at 600 can be optional because the subordinate MCD may establish its connection to the second access network without terminating its connection to the first access network such that the respective connections are maintained concurrently or in parallel.

After connecting to the second access network in 605, 610 through 635 of FIG. 6 substantially correspond to 510A through 535A, respectively, of FIG. 5A, except for the subordinate MCD being connected to the second access network instead of the first access network and contacting a second proxy server instead of the first proxy server. As will be appreciated, the first proxy server may have rejected the request for Internet-based access, but this does not necessarily imply that the second proxy server will also reject the service request because the different proxy servers are each configured to permit different levels or degree of service access to the subordinate MCD. Again, as an example, a proxy server to be contacted when the subordinate MCD is connected to an unlimited WiFi connection may be more likely to grant requested Internet-based services as compared to another proxy server to be contacted when the subordinate MCD is connected to a costly satellite access network.

Figure 7:
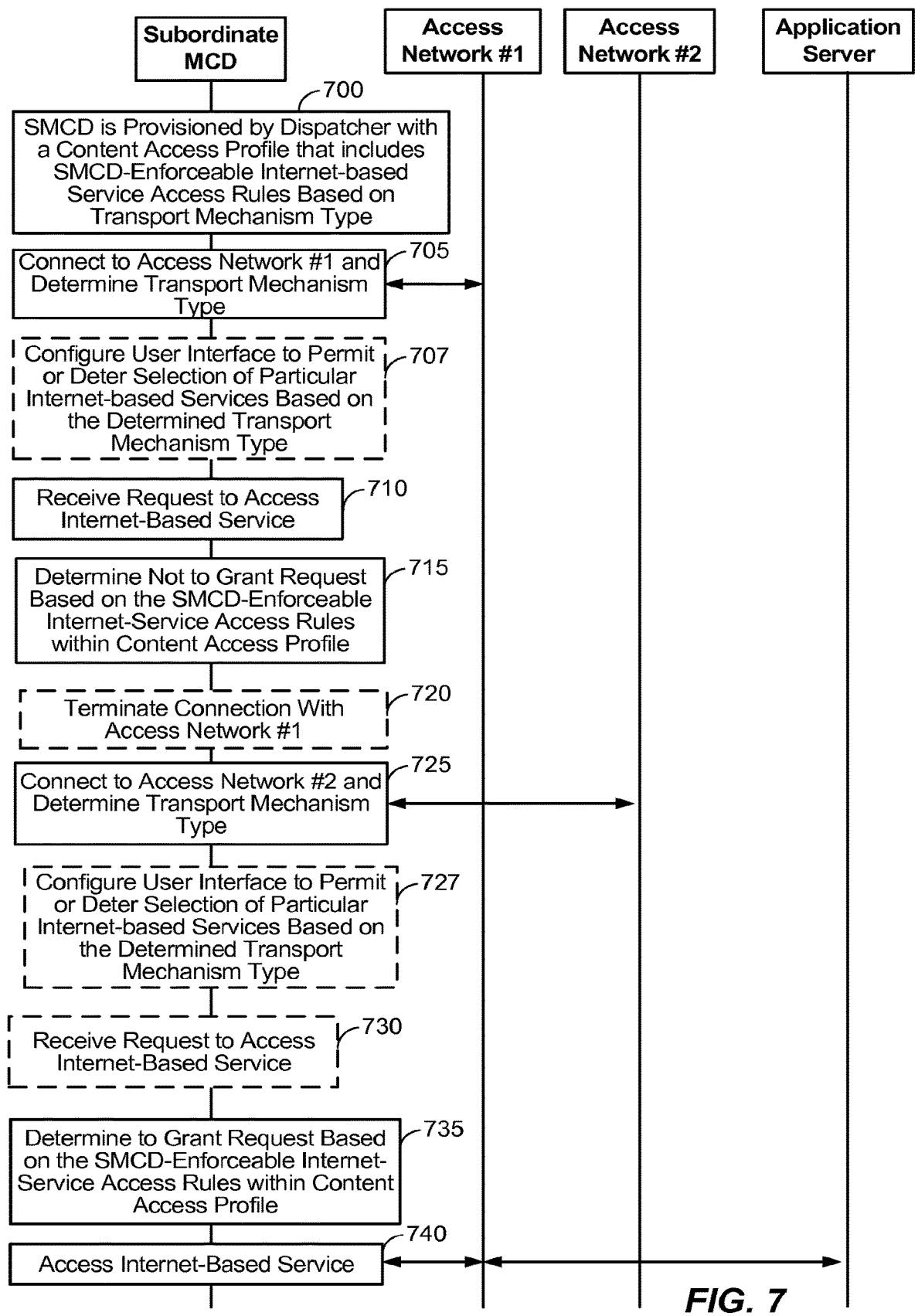
FIG. 7 is directed to a process whereby the subordinate mobile communication device enforces access restrictions based upon its current transport mechanism type in accordance with an embodiment of the invention.

While FIGS. 5A-6 relate to proxy server selection to enforce different degrees of service access to a subordinate MCD, FIG. 7 is directed to a process whereby the subordinate MCD itself enforces access restrictions based upon its current transport mechanism type in accordance with an embodiment of the invention.

Referring to FIG. 7, similar to 500A of FIG. 5A, the subordinate MCD is provisioned by the dispatcher with a content access profile that is based upon transport mechanism type, 700. However, unlike 500A of FIG. 5A, the content access profile provisioned at the subordinate MCD includes a set of Internet-based service access rules to be enforced at the subordinate MCD itself Thus, in FIGS. 5A-6, the subordinate MCD is simply responsible for looking up the appropriate proxy server based on its transport mechanism type and then obtaining or not obtaining access to Internet-based services based upon decision logic at the contacted proxy server, whereas the decision logic related to whether access is permitted is implemented at the subordinate MCD itself in FIG. 7. An example of the content access profile that is provisioned at 700 of FIG. 7 is provided below in Table 2, as follows:

TABLE 2

Example of MCD-enforceable Internet-based Service Access Rules Based Upon Transport Mechanism Type

| Transport Mechanism Type | Permitted Internet-Based Services | Blocked Internet-Based Services |
|---|---|---|
| WiFi (Unlimited) | Internet access permitted to all websites; Audio Streaming; Video Streaming; File Uploads (any size); File Downloads (any size). | None. |
| WiFi (Pay-per-use) | List of accessible websites; Audio Streaming; File Uploads (<2 GB); File Downloads (<5 GB). | All other websites blocked; Video Streaming; File Uploads (>=2 GB); File Downloads (>=GB). |

TABLE 2-continued

Example of MCD-enforceable Internet-based Service
Access Rules Based Upon Transport Mechanism Type

| Transport Mechanism Type | Permitted Internet-Based Services | Blocked Internet-Based Services |
|---|---|---|
| Satellite Base Station | List of accessible websites (Further Reduced from WiFi List of accessible websites); File Uploads (<250 MB); File Downloads (<500 MB). | All other websites blocked; Audio Streaming; Video Streaming; File Uploads (>=250 MB); File Downloads (>=500 MB). |
| Terrestrial Base Station (e.g., LTE, 3G, etc.) | List of accessible websites; Audio Streaming; File Uploads (<500 MB); File Downloads (<1 GB). | All other websites blocked; Video Streaming; File Uploads (>=500 MB); File Downloads (>=1 GB). |

Referring to 700 of FIG. 7, the provisioning of the content access profile can be implemented in a manner similar to 500A of FIG. 5A and/or any of FIGS. 5B-5D.

At some point after the subordinate MCD is deployed and in-use (e.g., the subordinate MCD is contained within a truck delivery vehicle during an active delivery, etc.), the subordinate MCD connects to a first access network and determines a first transport mechanism type associated with the first access network, 705 (e.g., similar to 505A of FIG. 5A). In an example, after determining the first transport mechanism type associated with the first access network, the subordinate MCD can optionally configure a user interface to preemptively permit or deter its operator to access certain Internet-based services based on the first transport mechanism type, 707. For example, assume that video streaming from a particular webpage is not permitted over 3G connections for the subordinate MCD and that the first transport mechanism type is 3G. With this assumption, the Internet-based service of accessing the particular webpage can be deterred by omitting or removing a uniform resource locator (URL) for the particular webpage from a Favorites list of a web browsing application on the subordinate MCD, and/or by removing or omitting the URL for the particular webpage from a Home Page of the web browsing application (i.e., transitioning the Home Page from the URL for the particular webpage to some other URL). In another example, assume that dynamic web-browsing (e.g., allowing the operator to input URLs) is not permitted over 1× connections for the subordinate MCD and that the first transport mechanism type is 1×. In this case, the Internet-based service of dynamic browsing can be deterred by omitting or removing a URL bar (e.g., a text entry bar for entering URLs of websites) from the web browsing application on the subordinate MCD. In another example, assume that video streaming from a particular webpage is permitted over WiFi connections for the subordinate MCD and that the first transport mechanism type is WiFi. With this assumption, the Internet-based service of accessing the particular webpage can be permitted by adding or maintaining a URL for the particular webpage to the Favorites list of the web browsing application on the subordinate MCD, and/or by adding or maintaining the URL for the particular webpage as the Home Page of the web browsing application. In another example, assume that dynamic web-browsing (e.g., allowing the operator to input URLs) is permitted over WiFi connections for the subordinate MCD and that the first transport mecha-nism type is WiFi. In this case, the Internet-based service of dynamic browsing can be permitted by adding or maintaining the URL bar within the web browsing application on the subordinate MCD. Accordingly, in an example, one or more of the Favorites List, Home Page and/or URL bar status for a given web-browsing application may change based on the current transport mechanism type The subordinate MCD then receives a request to access a particular Internet-based service (e.g., from an operator of the subordinate MCD), 710. In the embodiment of FIG. 7, assume that the subordinate MCD determines not to grant the request from 710 based on the Internet-based service access rules established within the content access profile from 700. For example, with Table 2 as an example of the content access profile, the requested Internet-based service may be streaming audio and video for a Netflix movie while the subordinate MCD is connected to a satellite base station, which is not permitted. While not shown explicitly in FIG. 7, the subordinate MCD may notify its operator with regard to the service denial and can optionally instruct the operator with respect to qualifying transport mechanism types for supporting the requested Internet-based service.

At some point after the subordinate MCD determines to deny the Internet-based service access request at 715, the subordinate MCD terminates its connection with the first access network, 720, and then connects to a second access network and determines a second transport mechanism type associated with the second access network, 725. Similar to 707, after determining the second transport mechanism type associated with the second access network, the subordinate MCD can optionally configure the user interface to preemptively permit or deter its operator to access certain Internet-based services based on the second transport mechanism type, 727 (e.g., by modifying the Home Page, URL bar status, Favorites List, etc. of a web-browsing application). In the embodiment of FIG. 7, assume that the second transport mechanism type of the second access network is different from the first transport mechanism type of the first access network. For example, the first transport mechanism may correspond to a satellite access network and the second transport mechanism may correspond to a terrestrial cellular access network or base station. Also, in the embodiment of FIG. 7, the connection termination shown at 720 can be optional because the subordinate MCD may establish its connection to the second access network without terminating its connection to the first access network such that the respective connections are maintained concurrently or in parallel.

After connecting to the second access network in 725, the subordinate MCD then receives a request to access a particular Internet-based service (e.g., from an operator of the subordinate MCD), 730. In an alternative example, the request reception at 730 is optional because the request can be inferred from the earlier request received at 710. In other words, the subordinate MCD can renew its attempt to service the Internet-based service request responsive to a detection of a new connection to a different access network. Alternatively, the earlier request from 710 can be abandoned altogether such that the request at 730 corresponds to a new request (e.g., either a re-issued request from the operator that requests the same Internet-based service as at 710, or a different request altogether).

In the embodiment of FIG. 7, assume that the subordinate MCD determines to grant the request from 730 based on the Internet-based service access rules established within the content access profile from 700. For example, with Table 2 as an example of the content access profile, the requested Internet-based service may be streaming audio and video for a Netflix movie while the subordinate MCD is connected to an unlimited WiFi connection, which is permitted. After determining to grant the request at 735, the subordinate MCD connects to the application server 170 that is configured to provide the granted Internet-based service, 740. In an example, the subordinate MCD need not connect to the application server 170 via a proxy server in the embodiment of FIG. 7 because the subordinate MCD is expected to self-regulate its access to Internet-based services using the content access profile as described above.

Figure 8A:
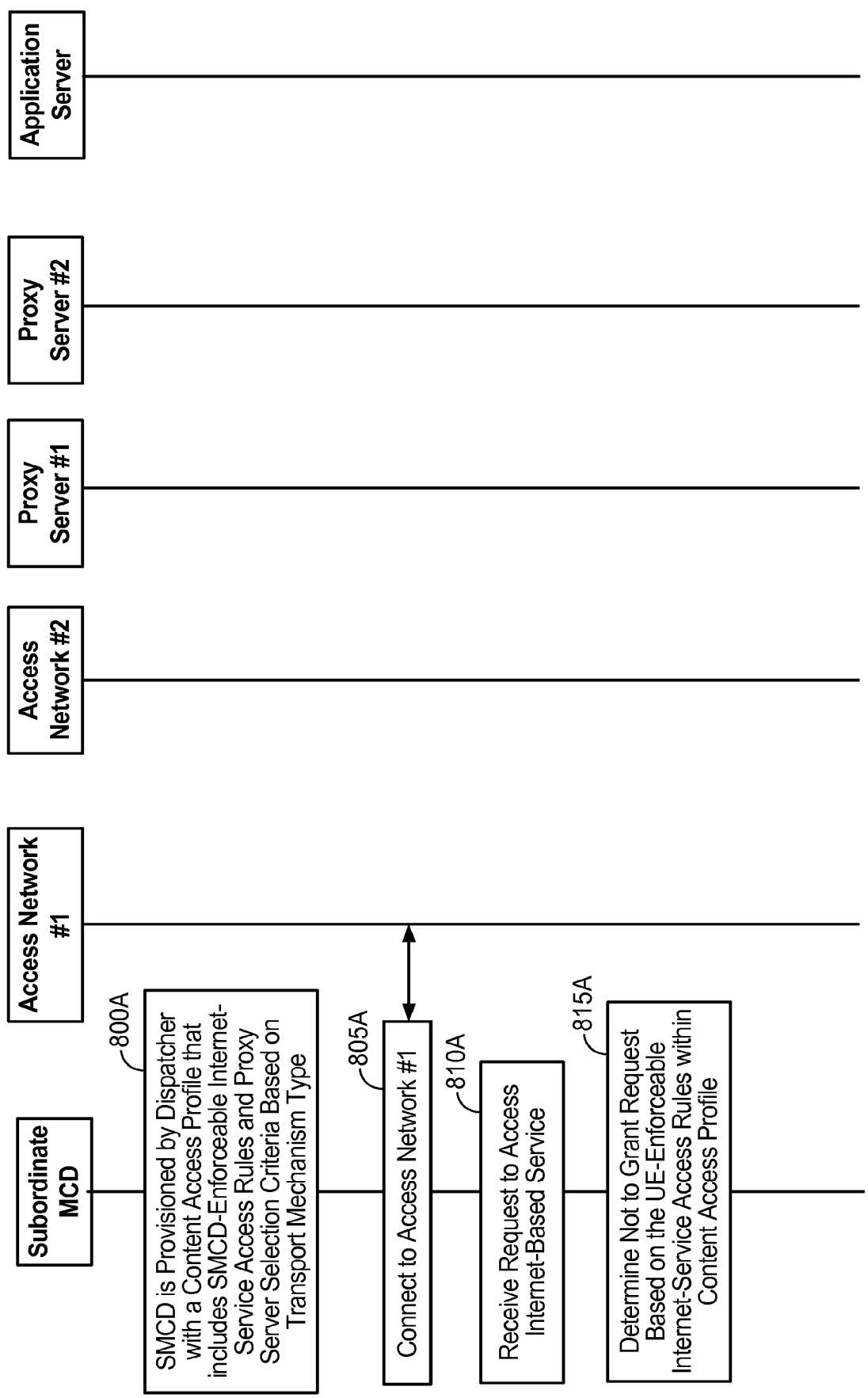
FIGS. 8A-8B correspond to a hybrid or merged approach whereby proxy server selection as in FIGS. 5A-6 is used in combination with independent access decisions at the subordinate mobile communication device as in FIG. 7 in accordance with an embodiment of the present invention.
Figure 8B:
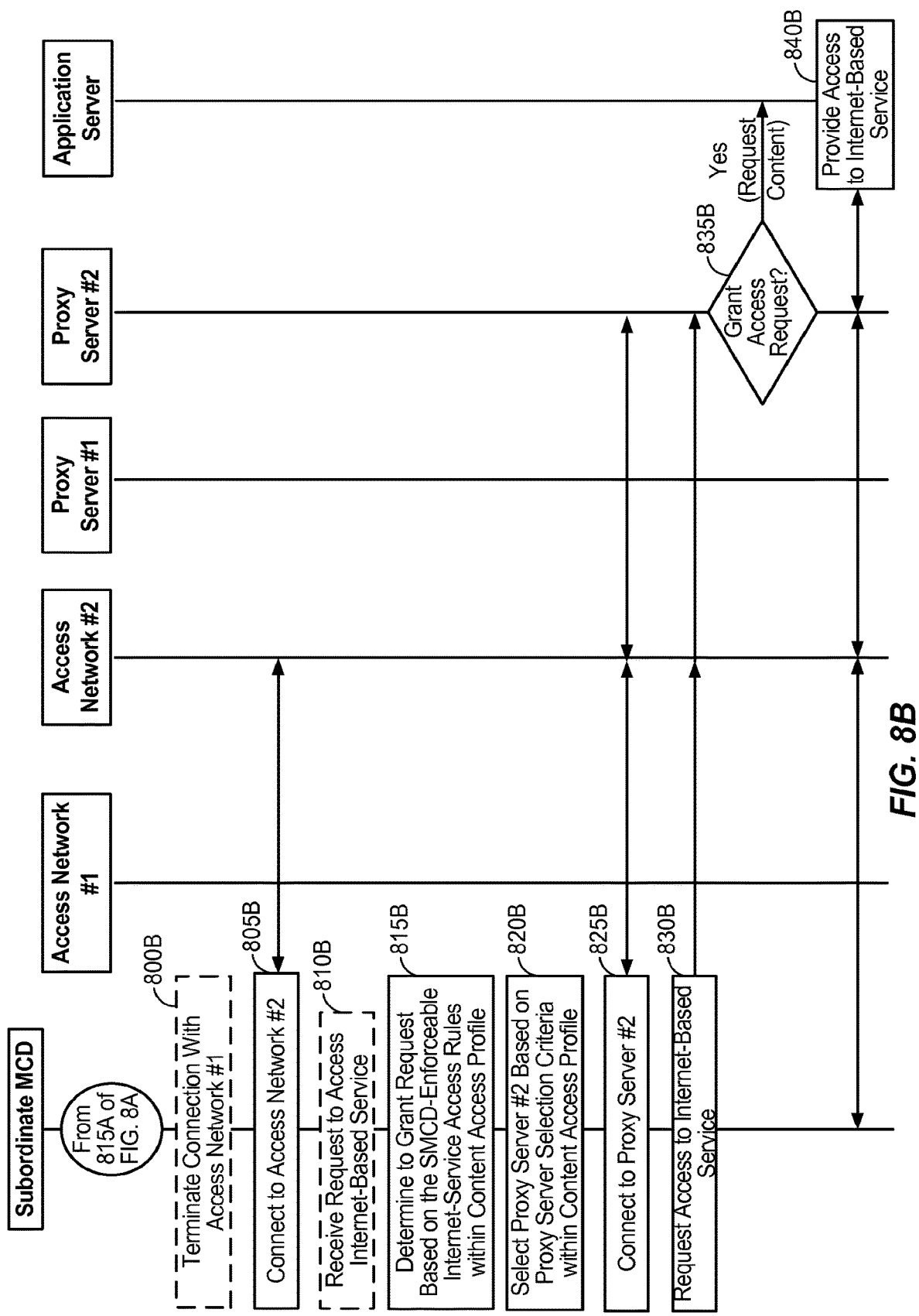

While the embodiments described above with respect to FIGS. 5A-6 rely upon a proxy server selection to regulate access of a subordinate MCD to Internet-based services and FIG. 7 relies upon the subordinate MCD to independently execute decision logic to determine access to Internet-based services, FIGS. 8A-8B correspond to a hybrid or merged approach whereby proxy server selection is used in combination with independent access decisions at the subordinate MCD in accordance with an embodiment of the present invention.

Referring to FIG. 8A, the subordinate MCD is provisioned by the dispatcher with a content access profile that is based upon transport mechanism type, 800A, similar to 500A of FIG. 5A or 700 of FIG. 7. The content access profile provisioned at 800A includes both (i) the proxy server selection criteria based on transport mechanism type as in the content access profile of 500A of FIG. 5A, and also (ii) the set of Internet-based service access rules to be enforced at the subordinate MCD as in the content access profile of 700 of FIG. 7. In an example, the content access profile of 700 can correspond to a combination of Tables 1 and 2 from the above-description.

Referring to FIG. 8A, 805A through 815A substantially to correspond to 705 through 715 of FIG. 7. Accordingly, the set of Internet-based service access rules from the content access profile established at 700 are used to block requests for Internet-based services that would simply be rejected outright so that requests destined for rejection need not be conveyed to the network.

The process of FIG. 8A continues in FIG. 8B, 800B through 815B substantially correspond to 720 through 735 of FIG. 7. However, after the subordinate MCD determines to grant access to the requested Internet-based service at 815B, instead of simply connecting to the application server 170 as in FIG. 7, the subordinate MCD instead leverages the proxy server selection criteria from the content access profile so as to execute the proxy server look-up procedure from FIG. 6. Accordingly, 820B through 840B substantially correspond to 615 through 635 of FIG. 6, respectively. Thus, even where the subordinate MCD can be relied upon to block network requests that can reasonably be expected to be rejected, the subordinate MCD can still implement the proxy server selection or look-up operation so as to select a proxy server for bridging the Internet-based service access request based on its current transport mechanism type.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a subordinate mobile communication device, comprising:
    receiving a content access profile from a dispatcher, the content access profile including a set of Internet-based service access rules to facilitate the subordinate mobile communication device to independently determine whether to grant or deny access by the subordinate mobile communication device to Internet-based services based on a transport mechanism type of a connection between the subordinate mobile communication device and an access network;
    connecting to a first access network via a connection to an access point;
    determining to access a given Internet-based service while connected to the first access network;
    determining a current transport mechanism type of the connection between the subordinate mobile communication device and the first access network, wherein the determined current transport mechanism type is selected from a plurality of transport mechanism types including: an unlimited WiFi or Wireless Local Area Network (WLAN) connection, a pay-per-use WiFi or WLAN connection, a cellular or terrestrial data connection, and a satellite data connection; and
    determining whether to grant or deny access by the subordinate mobile communication device to the given Internet-based service based on the determined current transport mechanism type of the connection between the subordinate mobile communication device and the first access network and the set of Internet-service access rules.

2. The method of claim 1, wherein each of the plurality of transport mechanism types is associated with a different Internet-based service access rule.

3. The method of claim 1, further comprising:
    configuring a user interface to permit selection of one or more Internet-based services including the given Internet-based service based upon the determined current transport mechanism type; and
    receiving a request to access the given Internet-based service via the configured user interface.

4. The method of claim 3,
    wherein the given Internet-based service corresponds to a given webpage, and
    wherein the configured user interface establishes a homepage of a web-browsing application as a Uniform Resource Locator (URL) associated with the given webpage to permit selection of the given Internet-based service.

5. The method of claim 3,
    wherein the given Internet-based service corresponds to a given web-page, and
    wherein the configured user interface adds a Uniform Resource Locator (URL) associated with the given webpage to a Favorites list of a web-browsing application to permit selection of the given Internet-based service.

6. The method of claim 3,
    wherein the given Internet-based service corresponds to dynamic web-browsing,
    and wherein the configured user interface adds a Uniform Resource Locator (URL) bar to a web-browsing application to permit selection of the given Internet-based service.

7. The method of claim 1, further comprising:
    configuring a user interface to deter selection of the given Internet-based service based upon the determined current transport mechanism type.

8. The method of claim 7, wherein the configuring occurs responsive to determining to deny access by the subordinate mobile communication device to the given Internet-based service.

9. The method of claim 7,
    wherein the given Internet-based services includes a given webpage, and
    wherein the configured user interface transitions a homepage of a web-browsing application from a Uniform Resource Locator (URL) that is associated with the given webpage to a URL that is not associated with the given webpage to deter the selection.

10. The method of claim 7,
    wherein the given Internet-based service includes a given webpage, and
    wherein the configured user interface removes or omits a Uniform Resource Locator (URL) associated with the given webpage from a Favorites list of a web-browsing application to deter the selection.

11. The method of claim 7,
    wherein the given Internet-based service include dynamic web-browsing, and wherein the configured user interface removes or omits a Uniform Resource Locator (URL) bar from a web-browsing application to deter the selection.

12. A subordinate mobile communication device, comprising:
    a memory;
    a processor communicatively coupled to the memory and configured to:
    receive a content access profile from a dispatcher, the content access profile including a set of Internet-based service access rules to facilitate the subordinate mobile communication device to independently determine whether to grant or deny access by the subordinate mobile communication device to Internet-based services based on a transport mechanism type of a connection between the subordinate mobile communication device and an access network;
    connect to a first access network via a connection to an access point;
    determine to access a given Internet-based service while connected to the first access network;
    determine a current transport mechanism type of the connection between the subordinate mobile communication device and the first access network, wherein the determined current transport mechanism type is selected from a plurality of transport mechanism types including: an unlimited WiFi or Wireless Local Area Network (WLAN) connection, a pay-per-use WiFi or WLAN connection, a cellular or terrestrial data connection or a satellite data connection; and determine whether to grant or deny access by the subordinate mobile communication device to the given Internet-based service based on the determined current transport mechanism type of the connection between the subordinate mobile communication device and the first access network and the set of Internet-service access rules.

13. The subordinate mobile communication device of claim 12, wherein each of the plurality of transport mechanism types is associated with a different Internet-based service access rule.

14. The subordinate mobile communication device of claim 12, wherein the processor is further configured to:
configure a user interface to permit selection of one or more Internet-based services including the given Internet-based service based upon the determined current transport mechanism type; and
receive a request to access the given Internet-based service via the configured user interface.

15. The subordinate mobile communication device of claim 14,
wherein the given Internet-based service corresponds to a given webpage, and
wherein the configured user interface establishes a homepage of a web-browsing application as a Uniform Resource Locator (URL) associated with the given webpage to permit selection of the given Internet-based service.

16. The subordinate mobile communication device of claim 12, wherein the processor is configured to:
configure a user interface to deter selection of the given Internet-based service based upon the determined current transport mechanism type, wherein the configuring occurs responsive to determining to deny access by the subordinate mobile communication device to the given Internet-based service.

17. A non-transitory computer-readable medium containing instructions stored thereon, which, when executed by a subordinate mobile communication device, causes the subordinate mobile communication device to perform operations, the instructions comprising:
at least one instruction for causing the subordinate mobile communication device to receive a content access profile from a dispatcher, the content access profile including a set of Internet-based service access rules to facilitate the subordinate mobile communication device to independently determine whether to grant or deny access by the subordinate mobile communication device to Internet-based services based on a transport mechanism type of a connection between the subordinate mobile communication device and an access network;
at least one instruction for causing the subordinate mobile communication device to connect to a first access network via a connection to an access point;
at least one instruction for causing the subordinate mobile communication device to determine to access a given Internet-based service while connected to the first access network;
at least one instruction for causing the subordinate mobile communication device to determine a current transport mechanism type of the connection between the subordinate mobile communication device and the first access network, wherein the determined current transport mechanism type is selected from a plurality of transport mechanism types including: an unlimited WiFi or Wireless Local Area Network (WLAN) connection, a pay-per-use WiFi or WLAN connection, a cellular or terrestrial data connection or a satellite data connection; and
at least one instruction for causing the subordinate mobile communication device to determine whether to grant or deny access by the subordinate mobile communication device to the given Internet-based service based on the determined current transport mechanism type of the connection between the subordinate mobile communication device and the first access network and the set of Internet-service access rules.

18. The non-transitory computer-readable medium of claim 17, wherein each of the plurality of transport mechanism types is associated with a different Internet-based service access rule.

* * * * *